United States Patent [19]

Ezran et al.

[11] Patent Number: 5,448,596
[45] Date of Patent: Sep. 5, 1995

[54] ALL-DIGITAL METHOD AND APPARATUS FOR DEMODULATING AN ANALOG SIGNAL

[75] Inventors: Philippe Ezran, Elancourt; Michel Le Clec'h, Issy Les Moulineaux; Serge Jeanclaude, Villeneuve, all of France

[73] Assignee: France Telecom, Paris, France

[21] Appl. No.: 93,656

[22] Filed: Jul. 20, 1993

[30] Foreign Application Priority Data

Jul. 21, 1992 [FR] France ................. 92 08998

[51] Int. Cl.$^6$ .................... H04B 1/10; H04L 27/06
[52] U.S. Cl. ...................... 375/350; 375/316
[58] Field of Search ............. 375/103, 99, 101, 106, 375/118, 94, 80, 75, 58; 364/724.01

[56] References Cited

U.S. PATENT DOCUMENTS 4,800,574 1/1989 Tanaka et al. ................. 375/26

FOREIGN PATENT DOCUMENTS 2566606 12/1985 France .

Primary Examiner—Stephen Chin
Assistant Examiner—Hai H. Phan
Attorney, Agent, or Firm—Larson and Taylor

[57] ABSTRACT

For digitally demodulating a PSK analog signal transmitted as a linearly modulated carrier and representing successive symbols at a rate 1/T, the signal is sampled at a rate $1/\tau$ at least twice the symbol rate 1/T, successive samples sampled with different filters selected from a plurality of filters corresponding to instants of no IES that are mutually offset by a fraction of the sampling $\tau$ that is optimum as regards coincidence between the respective sampling instant and an instant at which there is no ISI. A mean symbol demodulation rate equal to the symbol transmission rate is however retained. The signal as delivered by the selected filters in succession is decoded.

9 Claims, 1 Drawing Sheet

ALL-DIGITAL METHOD AND APPARATUS FOR DEMODULATING AN ANALOG SIGNAL

BACKGROUND OF THE INVENTION

The invention relates to a method and apparatus for digitally demodulating an analog signal comprising a linearly-modulated carrier and representing successive symbols. An important application for the invention lies in demodulators of modems that satisfy CCITT recommendations V27 and V29. The invention is nevertheless also applicable to test equipement and to equipment designed to demodulate and concentrate a plurality of modem calls.

Before describing the invention, it is appropriate to recall the fundamentals of linearly modulating a carrier to represent symbols and the currently used demodulation methods.

Linear modulation makes it possible for a signal to represent a digital sequence constituted by n different symbols $a_1, \ldots, a_n$ by means of an alphabet $S_1(t), \ldots, S_n(t)$. Each of the elementary signals constituting the alphabet is zero outside a time interval $[0,T]$, where $1/T$ is the symbol tranmsission rate. A symbol $a_p$ of order p in the alphabet of symbols is transmitted in time interval $[kT,(k+1)T]$ and is represented as $S_p(t-kT)$.

The kinds of linear modulation that are most used are phase modulation, amplitude modulation, and combined phase and amplitude modulation.

For a rate of 4800 bits/s, CCITT recommendations V29 and V27 respectively specify four-state phase modulation and eight-state differential phase modulation, known as PSK. For this type of modulation, the symbols are represented by:

$$S_p(t) = A \cdot \cos(2\pi f_0 t + \phi_p)$$

where A is a constant amplitude;
$f_0$ is the carrier frequency;
and $\phi_p$ is a phase which takes n different values in the range 0 to $2\pi$.

With combined phase and amplitude modulation, the symbols $a_p$ are represented by:

$$S_p(t) = A_p(2\pi f_0 t + \phi_p)$$

where, for two different symbols $a_p$ and $a_q$:

$$(A_p, \phi_p) \neq (A_q, \phi_q)$$

CCITT recommendation V29 specifies such modulation for the 9600 bits/s rate (quadrature amplitude modulation, QAM).

Since the phase absolute value is unknown at the receiver, demodulation is performed differentially: the symbol transmitted in interval $[kT, (k+1)T]$ is assigned to the phase difference between the signal transmitted in said interval and the signal transmitted during the preceding interval $[(k-1)T, kT]$.

The pass band of the transmission channel is generally limited. Consequently, filtering is required. In general, Nyquist filtering is used to eliminate intersymbol interference (ISI) at instants which follow one another at the symbol transmission rate. These symbols are then identified by determining the complex envelope of the received and filtered signal, sampling at instants when there is no ISI, and then comparing with thresholds or implementing some other decision argorithm.

A common solution consists in sharing Nyquist filtering equally between transmission and reception: each of the transmitter and the receiver includes irrespective filter having a transfer function such that its product with the transfer function of the other filter constitutes a raised cosine Nyquist filter.

Proposals have already been made for a digital method of demodulating an analog signal comprising a linearly modulated carrier representing successive symbols, the method comprising filtering to reduce intersymbol interference, sampling at a frequency that is at least twice the symbol transmission rate, detecting the complex envelope for eliminating the carrier, and decoding to recover the symbols. Document U.S. Pat. No. 4,800,574 describes a demodulator for implementing such a method and in which all operations are digital, except for the input filtering to reduce the noise caused by the limited pass band of the channel: to this end, the output signal from the filter is applied to an analog-to-digital converter. A demodulator organized in that way cannot provide complete demodulation of a plurality of simultaneous communications.

A receiver for receiving data from a recorded PSK or ASK signal has also been described in FR-A-2566604. It comprises an input analog-to-digital converter for sampling and digitizing the signal and two filters in quadrature. The clock which defines the sampling times is controlled by a loop for tracking instabilities of the record, whereby synchronism between the sampling frequency and the data rate may be achieved. The filters may further be controlled for adjusting the propagation time therein and to compensate for fast rate changes within a limited range, thereby solving a problem which is specific to demodulation of data stored on a medium, such as a magnetic tape, exhibiting unstabilities, however without loss of synchronism between the carrier and the rate signal.

SUMMARY OF THE INVENTION

It is an object of the invention to provide a demodulator that is totally digital in structure, and thus in which ISI-eliminating filtering must take place after the signal has been sampled and digitized. This approach a priori appears to be out of the question due to several difficulties: the instant at which there is no ISI in the period allocated to each symbol is initially unknown. Even if it coincides with a sample for a given symbol, coincidence will disappear for the following symbol unless the sampling frequency is an integer multiple of the symbol transmission rate. For example, in a demodulator incorporated in a modem for transmission at 2400 bauds with transmission over a PCM link that is sampled at 8000 Hz, asssuming that sample k coincides with an instant at which there is no ISI, then the following instant of no ISI will be situated between the instants at which samples k+3 and k+4 are obtained.

It is a more specific object of the invention to provide a fully digital method and apparatus overcoming such difficulties.

To this end, there is provided, in particular, a method including the step of performing, after the signal has been sampled, with a filter selected from a plurality of filters corresponding to instants of no ISI that are mutually offset by a fraction of the sampling period that is optimum as regards coincidence between the sampling instant and the instant at which there is no ISI, while maintaining a mean symbol demodulation rate equal to the symbol transmission rate.

The method can be implemented in numerous different ways.

A first solution consists in using a plurality of distinct filters, all filters having coefficients such that the instants of no ISI appear at the same rate, equal to the symbol transmission rate, but giving instants of no ISI that are time offset from one filter to the next. The filter used for a given symbol and the sample representative of said symbol are selected, for each symbol, by using a criterion that is based on the filter which was used and the sample which was selected as being representative of the preceding symbol.

Filter alternation is then determined by the sampling frequency and by the nominal or theoretical symbol transmission rate, as long as there is no drift. The number of filters required depends in particular on the ratio between the sampling frequency and the transmission rate and on the accuracy with which the no ISI instant needs to be approached.

This solution requires synchronization to be recovered and to be updated periodically, because of inevitable shift. To this purpose, a synchronization test may be performed during decision by comparing with thresholds. The tests consist in verifying that the computed phase difference and possibly also the calculated amplitude are close to those corresponding to symbols.

If the test shows a large error, then instead of using the normal procedure to select a filter, the selected filter is determined as being that filter for which the phase difference and amplitude are closest to those corresponding to symbols. This approach makes it possible to converge quickly to proper synchronization when initializing the method. Thereafter, it makes it possible to track any shift between the actual transmission rate and the nominal rate $1/T$.

Another solution consists in using a filter having controllable coefficients, which is equivalent to using a filter continuum. To do that, the rate is initially recovered responsive to the difference between the sampling instant and the instant of no ISI for a centered filter, and then filter coefficients are calculated causing each instant of no ISI to coincide with a sample. The rate may be recovered by implementing the gradient algorithm that is commonly used for this purpose, or a more complex algorithm as described below.

The invention will be better understood from the following description of particular embodiments, given as non-limiting examples. The description refers to the accompanying drawing.

DETAILED DESCRIPTION

In the description below, reference is made essentially to digital demodulation of signals from a modem complying with the V29 standard, using four state phase modulation and raised cosine filtering that is shared equally between transmission and reception, the carrier frequency being 1700 Hz. The description that is given is directly transposable to combined phase amplitude modulation, it being understood that when combined modulation is used, then demodulation requires not only phase difference to be compared with a threshold, but also the amplitude of the complex envelope to be compared with another threshold.

These parts in the complete demodulator which are conventional will not be described and reference may for instance be made to the above-identified prior patents.

In this case, demodulation is performed from digital samples taken directly from a signal transmitted over a pulse code modulated (PCM) link. The samples taken at a frequency $1/\tau = 8000$ Hz have values proportional to the amplitude of the signal, it being possible to perform prior linearization in conventional manner using the well known A law or $\mu$ law, generally by read out in a look up table stored in a processor.

For a bit rate of 4800 bits/s and a sampling frequency of 8000 Hz, three i.e. $(T/\tau = 5/3)$ digital filters suffice, corresponding to the following instants of no ISI:

$kT + \tau/3$ for the first filter,
$kT$ for the second filter,
$kT - \tau/3$ for the third filter.

Figure 1:
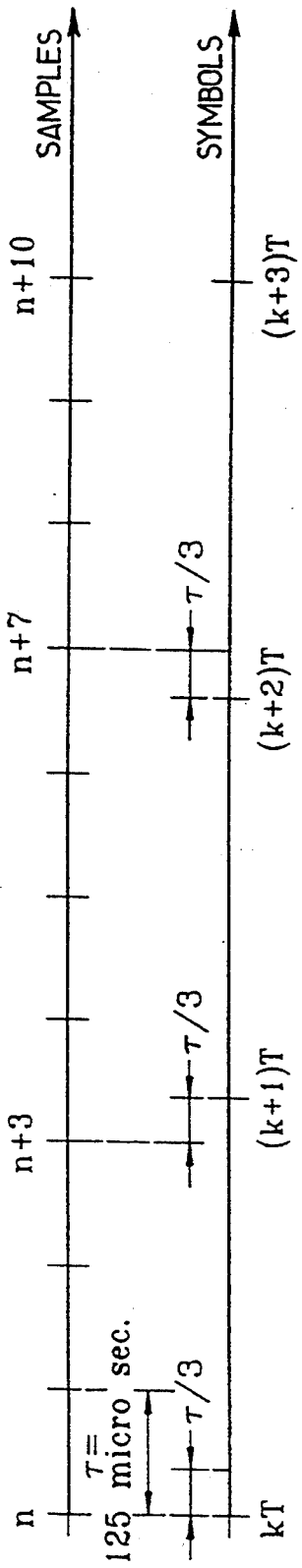
FIG. 1 shows the relative time distribution of symbols and samples, for digital demodulation of signals which are in compliance with recommendation V29, at a rate of 4800 bits/s and with sampling at 8000 Hz.

It can be seen from FIG. 1 that by switching from one filter to another it is possible to achieve near coincidence between each instant of no ISI and a sample. If the ratio between the bit rate $1/T$ and the frequency $1/\tau$ is less simple, i.e., involves two integers higher than 3 and 5, it may be necessary to increase the number of filters or to accept a coincidence that is less good between certain instances of no ISI and a sample. The same applies when there is a low time offset.

In the example shown in FIG. 1, the second filter is used for sample No. 0, then the third filter for sample No. 3 (since instant $(k+1)T$ lies between sample No. 3 and sample No. 4); thereafter the first filter is used for sample No. 7 and the cycle returns to the second filter for sample No. 10.

Figure 2:
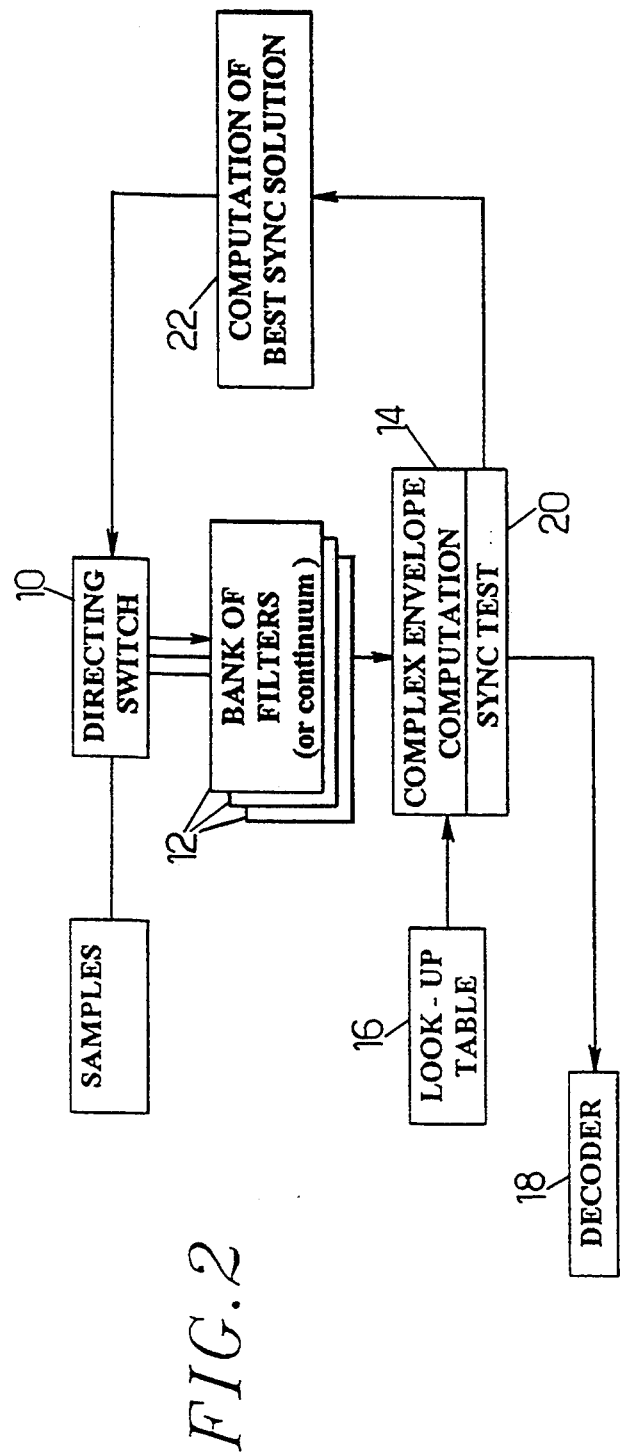
FIG. 2 is a possible block diagram of a demodulator of the invention.

The sequence of operations for demodulation appears in FIG. 2. The received samples are applied to a switch 10 which directs them to one of three filters 12. The output signal from the selected filter is applied to a circuit for determining the complex envelope thereof. Circuit 14 may comprise, in particular, a multiplier for multiplying by a complex sine wave at the carrier frequency, provided in digital form by a table 16. The transmitted symbol is applied to a decoder properly by speaking 18 which computes the phase difference of the complex envelope for instants $kT$ and $(k-1)T$. This difference may be calculated, in particular, by multiplying the value of the complex envelope at instant $kT$ by the complex conjugate of the envelope at time $(k-1)T$, as stored in a read/write memory (RAM). The resulting phase difference is compared with threshold values.

This avoids any need to calculate the carrier frequency: The complex sine wave used for multiplication is at the nominal carrier frequency, i.e. 1700 Hz in the above case. Any error between the real carrier frequency and the nominal frequency will only give rise to a small phase error that has no practical consequence for demodulation. The transmitted symbols may be determined in other ways. For example, it is possible to perform iterative axis calculation. When the method is initialized, a system of axis is chosen arbitrarily which determines which transmitted signals are possible, it being necessary to make such an arbitrary choice since the absolute phase of the signal is unknown. For each new value, demodulation is performed and the closest of the possible signals is determined, after which its phase difference relative to the preceding signal is calculated. The axis calculation is then iterated by computing a weighted average value of the old system of axes and the system of axes that corresponds to the new values. This converges quickly on the correct system of axes, and it is possible to track the rotation of the system of axes that takes place over time whenever the carrier frequency is not exactly equal to the stored nominal frequency.

While the above method is a little more complex than the preceding method, it has the advantage of providing demodulation that is more accurate since noise at instants $(k-1)T$ and $kT$ do not add.

Like the preceding method, the above method does not require the carrier frequency to be computed. Any error between the real carrier frequency and the nominal frequency as stored appears as a rotation of the axes.

In both cases, resynchronisation has to be performed, in practice since the instants of no ISI are unknown a priori, and the rate $1/T$ may be slightly different from the nominal rate of 2400 bauds. The switch 10 is controlled to be capable of more than switching the samples to the various different filters in a predetermined repetitive sequence. A synchronization test is performed at 20 after demodulation. This test consists in verifying whether the phase difference is close to a multiple of 90° (for four-phase modulation) or whether the complex envelope is close to one of the axes in the current set of axes.

If the test shows a significant error, the result of the demodulation is stored and a synchronization change is performed for the following symbol. Given that the lead or the lag relative to the instant of no ISI is unknown a priori, resynchronization is performed by a circuit 22 that receives the necessary data from the circuit 14 for computing the envelope and demodulating. The circuit 22 determines two possible synchronizations (corresponding to instants of no ISI situated on either side of the instant that results from the normal selection sequence), and it retains the change of synchronization that satisfies one and/or the other of the following two criteria:

phase difference close to a multiple of 90° (or a multiple of the unit phase difference when using modulation with more than four phases) relative to the last instant at which the synchronization test was positive; and complex envelope closest to an axis.

There follows a description in greater detail of characteristics that may be given to the reception filters in a demodulator of the invention applicable to the above case of four-state phase modulation.

In particular, it is possible to use a conventional raised-cosine filter using a decay or roll-off factor equal from 0.125, equally shared between transmission and reception.

In base band, the transfer function $N_y$ of such a raised cosine Nyquist filter may be written as:

$$N_y(f) = T$$
$$|f| \leq 0.875/2T$$

$$N_y(f) = T/2\,(1 - \sin(8\pi T|f|))$$
$$0.875/2T < |f| \leq 1.125/2T$$

$$N_y(f) = 0$$
$$|f| > 1.125/2T$$

When the filter is equally shared between transmission and reception, the transfer function R of the reception filter can then be written:

$$R(f) = T^{\frac{1}{2}}$$
$$|f| \leq 0.875/2T$$

$$R(f) = (T/2\,(1 - \sin(8\pi T|f|)))^{\frac{1}{2}}$$
$$0.875/2T < |f| \leq 1.125/2T$$

$$R(f) = T^{\frac{1}{2}} \cos(4\pi T|f| + \pi/4)$$

$$R(f) = 0$$
$$|f| > 1.125/2T$$

The impulse response associated with the reception filter can be written as follows (ignoring a multiplicative constant):

$$r(t) = (2T^3/2)/(4\pi T^2 - \pi t^2).\cos(1.125\pi t/T)$$
$$+ (4T^{5/2})/t(4\pi T^2 - \pi t^2).\sin(0.875\pi t/T)$$

The above transfer filter R and impulse response $r(t)$ are those of the equivalent in base band of the "second" filter defined above.

The first filter which satisfies the no ISI condition at instants $(kT + \tau/3)$ has the following transfer function in base band:

$$R_1(f) = R(f).\exp(-i2\pi f\tau/3) \qquad (1)$$

and its impulse response is:

$$r_1(t) = r(t - \tau/3).$$

For the third filter, the transfer function and the impulse response are symmetrical:

$$R_3(f) = R(f).\exp(+i2\pi f\tau/3)$$

$$r_3(t) = r(t + \tau/3)$$

The associated signal is obtained by filtering around the carrier frequency $f_0$. The impulse response of each of the filters used is obtained by multiplying the impulse response of the equivalent filter in base band by $\exp(i\pi f_0 t)$. The appropriate shift is selected from $-\tau/3$, 0 and $+\tau/3$ by the processes defined above.

The use of a filter continuum requiring iterative computation also implies starting from an equation that generalizes (1). A base band filter satisfying the no-ISI condition at instants $t_0 + kT$ (instead of $kT + \tau/3$) has the following transfer function:

$$R_{t0}(f) = R(f).\exp(-i2\pi f t_0)$$

Its impulse response is:

$$r_{t0}(t) = r(t - t_0)$$

and, if filtering takes place around carrier frequency $f_0$, the overall impulse response becomes:

$$r_{t0}(t).\exp(i2\pi f_0 t)$$

The iteration seeks to obtain the optimum value of $t_0$. To do that, it is possible to obtain an approximate value for the derivative of the value of the complex envelope by taking the difference between two mutually close instants.

The coefficients of the filters to be used are deduced from the obtained value.

If the value of the complex envelope is designated as $\lambda$ and $\hat{a}_k$ designates the value of the kth symbol estimated by demodulation using the filter corresponding to $t_{0,k}$, at sampling instant $n_k$, the next symbol will be estimated at a time later than $t_k$ by $$T + \alpha Re(\hat{a}_k^* \cdot d\lambda/dt) - t_{0,k},$$

$\alpha$ being a parameter that is selected as a function of the accuracy desired in the estimation.

By knowing the sampling frequency, it is possible to calculate the amount of offset $t_0$ that makes the no-ISI instant coincide with a sample $(T + \alpha Re(\hat{a}_k^* \cdot d\lambda/dt) - t_{0,k} + t_{0,k+1}$, which must be an integer multiple of the sampling period.

As a further example, reference will be made to an apparatus having six filters with a mutual offset $\tau/6$, distributed into two banks of each three filters, the filters of a same bank being mutually offset of $\tau/3$ and an initialization procedure will be given, suitable for use whenever the communication protocol includes an initialization sequence of two alternating symbols A and B; then with a sufficiently long sequence it may be shown that the complex envelope in a middle portion is represented by sine shape function s(t):

$$s(t) = [(A+B)/2] + [(A-B)/2]\cos \pi t/T \qquad (2)$$

having a frequency equal to half the rate of transmission of symbols.

Initialization

Frequently a protocol is used which has a segment which is easily identified because it immediatly follows a silent period. A typical segment consists of 128 alternating symbols A and B. In the absolute constellation:
A = −3 and B = −3i at 4800 bits/s
A = −3 and B = 1−i at 7200 bits/s
A = −3 and B = −3−3i at 9600 bits/s.

The no-ISI instants are those for which the value of the complex envelope of the signal is A or B.

Initially, sampling is "blind" i.e. has a random location within the symbol period. The positions of A and B in the "relative" constellation are unknown.

In the middle section of the segment, the edge effects are negligible. Then it results from formula (2), which is valid as long as the influence of the channel noise is attenuated by averaging over a large number of points, that the slope of the sine wave is steepest at point $(A+B)/2$, at instants which have a time lag or lead of $T/2$ with respect to the no-ISI points. Techniques for digitally evaluating the point of maximum slope of a function are well known. After it has been found, synchronization is achieved by sampling at the no-ISS points.

Synchronization tracking

Again assuming that there are two banks of three filters, demodulation in steady condition is carried out by successive use of the three filters of a same bank. When a synchronization offset is necessary, the other bank may be used for causing a sync shift equal to $\tau/6$.

Control may use the following approach, starting from the finding that the slope of the complex envelope at any time kT may be written as:

$$P_k = (1/T) \Sigma s(n+k) cs'(-n)$$

where n designates an integer fulfilling the condition $-N_0 \leq n \leq N_0$, and refers to symbols where distance to k does not exceed $N_0$.

A development limited to the first order is sufficient for providing an estimation of the complex envelope in the vicinity of kT.

$$r(kT+t) = s(k) + p_k t/T$$

If $\langle \ldots \rangle$ is used for designating a scalar product SP:

$$SP = \langle r(kT+t) - s(k), p_k \rangle = (3t/10\tau) |p_k|^2$$

Synchronization should be shifted by $\pm \tau/6$ when $|t/\tau| > 1/12$.

Consequently a new filter should be switched in as soon as $SP/|p_k|^2$ becomes greater than 1/40.

For more precision and for avoiding frequent switching the rate may be estimated as a weighted average over several successive symbols; since the time evaluation is improved when $|p_k|^2$ is larger, it is of advantage to standardize with respect to $|p_k|^2$. Then the test becomes:

$$\Sigma SP / \Sigma |p_k|^2 > 1/40$$

The number of samples (or, preferably, a value of $\Sigma |p_k|^2$) may be predetermined.

We claim:

1. A method for digitally demodulating an analog signal transmitted as a linearly modulated carrier and representing successive symbols at a symbol transmission rate $1/T$, comprising the steps of:

sampling said signal at a predetermined constant rate $1\tau$ at least twice the symbol rate $1/T$;

filtering successive samples of the sampled signal each with one of a plurality of mutually different filters, said filters having coefficients such that instants of no intersymbol interference (ISI) appear at the same rate, equal to the symbol transmission rate, but having instants of no ISI that are time offset from one filter to the next by a predetermined fraction of the sampling period $\tau$, said filters being successively used in a time sequence such that each of said mutually different filters is selected when it provides a best match between the respective sampling instant and an instant at which there is no ISI, while maintaining a mean symbol demodulation rate equal to the symbol transmission rate; and decoding the signal delivered by the selected filters which are used in succession.

2. A method according to claim 1, wherein said filters are alternated at a rate determined by the sampling rate and by a theoretical symbol transmission rate, as long as there is no transmission rate drift.

3. A method according to claim 1, wherein a modulation of said linearly modulated carrier is QPSK modulation at a symbol rate of 2400 bauds, sampling is at a rate of $1/\tau = 4800$ bits/s and selection is between three of said filters mutually offset by $\tau/3$.

4. A method according to claim 2, further comprising a preliminary step of recovering synchronization and comprising a further step of periodically updating the alternance of said filters.

5. A method according to claim 4, wherein said further step comprising determining two possible synchronizations corresponding to instants of no ISI situated on either side of the instant that results from a normal selection sequence and retaining a change of synchronization that satisfies at least one of two criteria, one of said criteria comprising finding a phase difference close to a multiple of a unit phase difference of modulation relative to the last instant at which a preceding synchronization test was positive and the other of said criteria comprising the complex envelope for the selected synchronization closest to an axis.

6. A method according to claim 4, wherein decoding includes multiplying the signal delivered by the selected filters by a stored complex sine wave at an expected frequency of said carrier, determining a phase difference between complex envelopes resulting from said multiplication at successive instants $\kappa T$ and $(\kappa-1)T$, $\kappa$ being an integer, and comparing the phase difference with threshold values.

7. An apparatus for digitally demodulating an analog signal transmitted as a linearly modulated carrier and representing successive symbols at a symbol transmission rate $1/T$, said apparatus comprising:

means for sampling said signal at a predetermined rate $1/\tau$ at least twice the symbol rate $1/T$;

at least one plurality of mutually different filters for filtering successive samples of the sampled signal, said filters having coefficients such that instants of no intersymbol interference (ISI) appear at the same rate, but having instants of no ISI that are mutually offset from one filter to the next by a same fraction of the sampling period $\tau$, means for directing said samples received in succession to different ones of filters selected from said plurality of filters wherein said filters are successively used in a time sequence such that each of said mutually different filters is selected when it provides a best match between the respective sampling instant and an instant at which there is no ISI while maintaining a mean symbol demodulation rate equal to the symbol transmission rate; and means for decoding the signal delivered by the selected filters used in succession.

8. An apparatus according to claim 7, comprising several pluralities of said mutually different filters each corresponding to instants of no ISI that have a common lag as compared with respective instants of no ISI of the other pluralities and having means for switching from one said plurality to another said plurality responsive to drift of synchronization.

9. A method for digitally demodulating an analog signal transmitted as a linearly modulated carrier and representing successive symbols at a symbol transmission rate $1/T$, said method comprising the steps of:

(a) sampling said signal at a predetermined rate $1/\tau$ at least twice the symbol rate $1/T$;

(b) filtering successive samples of the sampled signal with filter means which have a set of controllable coefficients, said filtering including:

(b1) measuring a difference between instants of sampling with preset coefficients of said filter means and instants when said samples have no intersymbol interference ISI, for recovering the transmission rate;

(b2) calculating a plurality of sets of values of said set of coefficients, each of said sets of values defining a filtering function that has instants of no intersymbol interference ISI which are time offset by a fraction of the sampling period $\tau$ that provides a best possible match between the respective sampling instants of some of the samples which appear at regular time intervals and instants at which there is no ISI; and (b3) successively adopting said sets of values according to a sequence which provides said best match for filtering said successive samples; and (c) decoding the signal delivered by the filter means.

* * * * *